(12) United States Patent
Terrero et al.

(10) Patent No.: US 9,851,883 B2
(45) Date of Patent: Dec. 26, 2017

(54) METHOD AND APPARATUS FOR ADJUSTING AND MOVING A USER INTERFACE FOR SINGLE HANDED USE ON AN ENDPOINT DEVICE

(71) Applicant: Xerox Corporation, Norwalk, CT (US)

(72) Inventors: Carlos M. Terrero, Ontario, NY (US); Roberto A. Irizarry, Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 217 days.

(21) Appl. No.: 14/181,985

(22) Filed: Feb. 17, 2014

(65) Prior Publication Data
US 2015/0234581 A1    Aug. 20, 2015

(51) Int. Cl.
G06F 3/0488    (2013.01)
G06F 3/0484    (2013.01)
H04M 1/02    (2006.01)

(52) U.S. Cl.
CPC ........ G06F 3/04847 (2013.01); G06F 3/0488 (2013.01); G06F 3/04886 (2013.01); H04M 1/0281 (2013.01); H04M 2250/22 (2013.01)

(58) Field of Classification Search
CPC .......... G06F 3/017; G06F 3/041; G06F 3/044; G06F 3/0481; G06F 3/04842; G06F 3/04847; G06F 3/0488; G06F 3/04886; G06F 2200/1637; G06F 2203/04806; H04M 1/72563
USPC .......................................... 715/863; 345/173
See application file for complete search history.

(56) References Cited

U.S. PATENT DOCUMENTS

| 5,841,425 A * | 11/1998 | Zenz, Sr. .............. | G06F 3/0213 345/158 |
| 8,631,358 B2 | 1/2014 | Louch | |
| 8,769,431 B1 * | 7/2014 | Prasad .................... | G06F 3/048 715/764 |
| 2010/0085317 A1* | 4/2010 | Park ...................... | G06F 1/1626 345/173 |
| 2011/0057907 A1* | 3/2011 | Kim ........................ | G06F 3/042 345/175 |
| 2013/0237288 A1* | 9/2013 | Lee .......................... | G06F 3/041 455/566 |
| 2015/0084885 A1* | 3/2015 | Kawamoto ........... | G06F 3/0482 345/173 |

FOREIGN PATENT DOCUMENTS

WO    WO 2012/004176    1/2012

OTHER PUBLICATIONS

KR101272614 ENG machine translations published on Jun. 10, 2013.*

* cited by examiner

Primary Examiner — Rinna Yi

(57) ABSTRACT

A method, non-transitory computer readable medium, and apparatus for adjusting and moving a user interface for single handed use on an endpoint device are disclosed. For example, the method determines a thumb span of a hand of a user on a touch screen display of the endpoint device, detects via one or more sensors on the endpoint device that the user is holding the endpoint device with a single hand, adjusting a size of the user interface to be within dimensions of the thumb span in response to the detecting and moves the user interface in a direction towards the single hand in response to the detecting.

7 Claims, 5 Drawing Sheets

METHOD AND APPARATUS FOR ADJUSTING AND MOVING A USER INTERFACE FOR SINGLE HANDED USE ON AN ENDPOINT DEVICE

The present disclosure relates generally to user interfaces on endpoint devices and, more particularly, to a method and an apparatus for adjusting and moving a user interface for single handed us on an endpoint device.

BACKGROUND

Smart phones or touch screen devices initially were designed to fit comfortably in a single hand of a user. However, as smart phones or touch screen devices are being used to consume more multimedia content, in addition to being used as a telephone, the screen sizes are increasing. As a result, the overall size of the smart phones and touch screen devices are also increasing.

As the smart phones become larger, operating the smart phone with a single hand becomes more difficult. Currently, some devices allow a user to go through a complicated series of menus to manually bias the interface to a desired hand preference. In addition, if the user is proficient using both hands, then the user would be required to manually change the bias of the interface through the complicated series of menus each time the user changes his or her hand to hold the smart phone. This would lead to an unsatisfactory user experience.

SUMMARY

According to aspects illustrated herein, there are provided a method, a non-transitory computer readable medium, and an apparatus for adjusting and moving a user interface for single handed use on an endpoint device. One disclosed feature of the embodiments is a method that determines a thumb span of a hand of a user on a touch screen display of the endpoint device, detects via one or more sensors on the endpoint device that the user is holding the endpoint device with a single hand, adjusting a size of the user interface to be within dimensions of the thumb span in response to the detecting and moves the user interface in a direction towards the single hand in response to the detecting.

Another disclosed feature of the embodiments is a non-transitory computer-readable medium having stored thereon a plurality of instructions, the plurality of instructions including instructions which, when executed by a processor, cause the processor to perform an operation that determines a thumb span of a hand of a user on a touch screen display of the endpoint device, detects via one or more sensors on the endpoint device that the user is holding the endpoint device with a single hand, adjusting a size of the user interface to be within dimensions of the thumb span in response to the detecting and moves the user interface in a direction towards the single hand in response to the detecting.

Another disclosed feature of the embodiments is an apparatus comprising a processor and a computer readable medium storing a plurality of instructions which, when executed by the processor, cause the processor to perform an operation that determines a thumb span of a hand of a user on a touch screen display of the endpoint device, detects via one or more sensors on the endpoint device that the user is holding the endpoint device with a single hand, adjusting a size of the user interface to be within dimensions of the thumb span in response to the detecting and moves the user interface in a direction towards the single hand in response to the detecting.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer-readable medium for adjusting and moving a user interface for single handed use on an endpoint device. As discussed above, as the smart phones become larger, operating the smart phone with a single hand becomes more difficult. Currently, some devices allow a user to go through a complicated series of menus to manually bias the interface to a desired hand preference. In addition, if the user is proficient using both hands, then the user would be required to manually change the bias of the interface through the complicated series of menus each time the user changes his or her hand to hold the smart phone. This would lead to an unsatisfactory user experience.

One embodiment of the present disclosure addresses this problem by providing sensors on each side of the endpoint device to automatically detect when the user is holding the endpoint device with a single hand and with which hand (e.g., with either the left hand or the right hand of the user). In response to detecting that the user is holding the endpoint device with a single hand, the endpoint device may automatically adjust the size of the user interface and move the user interface towards a hand the user is using to hold the endpoint device in accordance with a predetermined thumb span of the user.

Different users may have different sized thumbs. As a result, the thumb span, or the amount of area a user's thumb can cover on a touch screen display of the endpoint device, of each different user will vary. For example, a user with a smaller thumb may cover less area than a user with a larger thumb. One embodiment of the present disclosure may measure the user's thumb span to ensure that the user interface is resized or customized to be within the dimensions of the user's thumb span to maximize the experience of the user when operating the endpoint device with a single hand.

Figure 1:
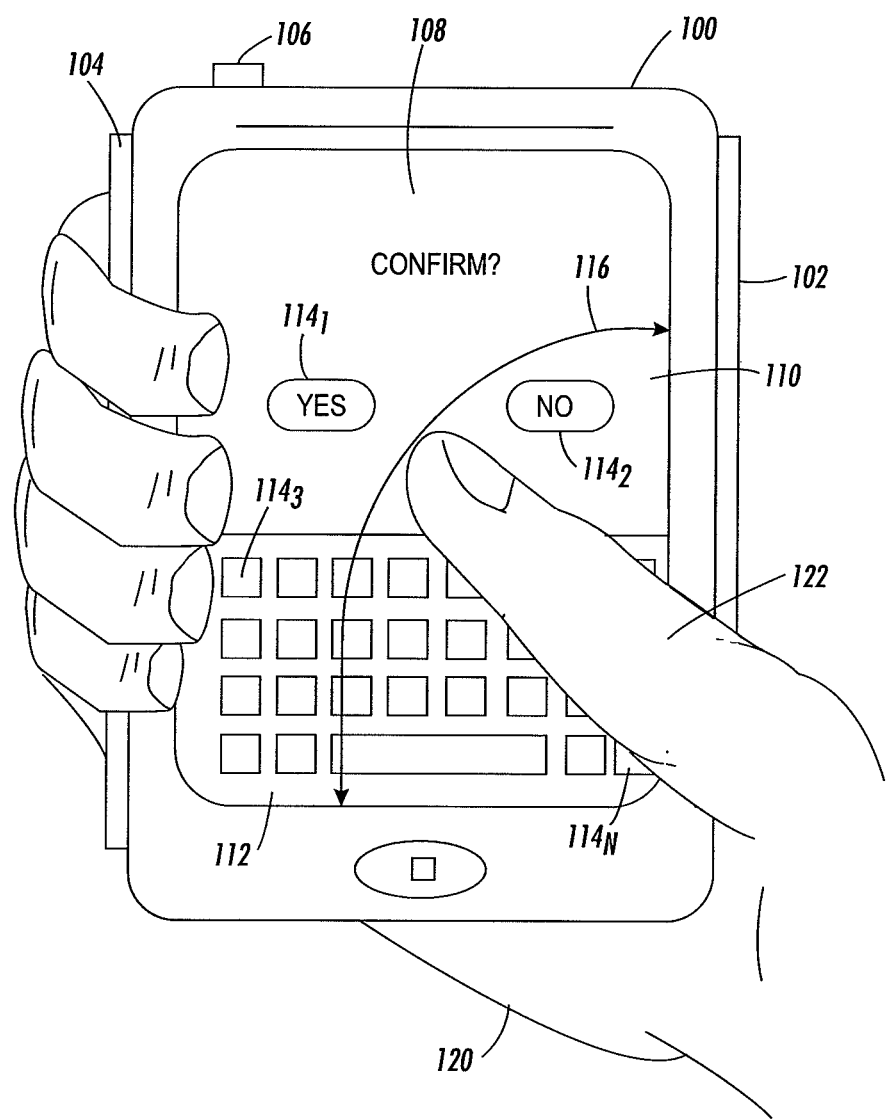
FIG. 1 illustrates an example block diagram of an endpoint device having an originally sized user interface.

FIG. 1 illustrates an example endpoint device 100 of the present disclosure. The endpoint device 100 may be any type of endpoint device having a touch screen display 108. For example, the endpoint device 100 may be a smart phone, a tablet computer, and the like.

In one embodiment, the endpoint device 100 is larger than a hand 120 of the user. For example, a thumb span 116 of the user's hand 120 does not reach all areas of the touch screen display 108 of the endpoint device 100 when the user holds the endpoint device 100 with a single hand.

In one embodiment, the thumb span 116 may be defined as an amount of area a user's thumb 122 can cover when the user operates the endpoint device 100 with a single hand. The area that can be covered by a thumb span 116 of a user may be defined by dimensions (e.g., including a height and a width).

In one embodiment, the endpoint device 100 may include one or more sensors 102 and 104 on each side of the endpoint device 100. The one or more sensors 102 and 104 may be used to automatically detect when the user is holding the endpoint device 100 in a single hand. The one or more sensors 102 and 104 may also automatically detect which hand the user is using (e.g., the user's left hand or the user's right hand). Identifying the hand the user is using may determine which direction the user interface or interfaces are moved, as discussed below.

In one embodiment, the one or more sensors 102 and 104 may comprise a capacitive sensor array. The capacitive sensor arrays on each side of the endpoint device 100 may determine which hand the user is using by determining which side has non-continuous contact of consecutive sensors of the capacitive sensor array and which side has continuous contact of consecutive sensors of the capacitive sensor array. For example, a user's palm would provide continuous contact of two or more consecutive sensors and a user's fingers on the opposite side of the endpoint device would have non-continuous contact of two or more consecutive sensors due to the separated finger tips. Thus, if the continuous contact of consecutive sensors of the capacitive sensor array is on the left side of the endpoint device 100, then the user is using his or her left hand. Conversely, if the continuous contact of consecutive sensors of the capacitive sensor array is on the right side of the endpoint device 100, then the user is using his or her right hand.

In one embodiment, the one or more sensors 102 and 104 may comprise temperature sensors. For example, a first temperature sensor may be on a first side and the second temperature sensor may be on a second side of the endpoint device 100. In one embodiment, a difference in the first temperature sensor and the second temperature sensor may determine whether the user is holding the endpoint device 100 in his or her right hand or left hand. For example, a user's palm is typically warmer than the user's finger tips. As a result, when a temperature sensor measures a temperature on a left side of the endpoint device 100 is greater than a temperature measured by a temperature sensor on the right side of the endpoint device 100, the mobile endpoint device 100 may determine that the user is holding the mobile endpoint device in his or her left hand. If the user is holding the endpoint device 100 in his or her right hand, the temperature measured on the right side would be greater than the temperature measured on the left side.

In one embodiment, the temperature sensor may require a temperature measurement to be greater than an ambient air temperature to avoid false positives. For example, a user may want to have text displayed on the entire touch screen display 108 for reading and is holding the endpoint device 100 by only one side the mobile endpoint device (e.g., touching a front side, a left side and a back side and the right side is not touched). In this example, the endpoint device 100 would not adjust and move the user interface, as discussed below, due to the difference in temperature measurements detected by the temperature sensors (e.g., a temperature of the user's palm on the left side and the ambient air temperature on the right side).

In one embodiment, the one or more sensors 102 and 104 may comprise an optical sensor. For example, an optical sensor may include an ambient light or a proximity sensor. In one embodiment, the optical sensor may be located on a lower portion on each side of the endpoint device 100. As a result, when the user holds the endpoint device 100 with a single hand for single handed operation, the user's palm would block the optical sensor. Meanwhile, the finger tips of the user on the opposite side of the endpoint device 100 would not block the optical sensor. Thus, the hand the user is using (e.g., the right hand or the left hand) may be determined based upon which side is blocking the optical sensor. For example, if the optical sensor is blocked on the left side, the user is using his or her left hand and if the optical sensor is blocked on the right side, the user is using his or her right hand.

In one embodiment, the one or more sensors 102 and 104 may comprise pressure sensors. For example, a pressure sensor may be located on a lower portion on each side of the endpoint device 100. As a result, when the user holds the endpoint device 100 with a single hand for single handed operation, the user's palm would engage the pressure sensor on a lower portion of a respective side of the endpoint device 100. Meanwhile, the finger tips of the user on the opposite side of the endpoint device 100 would be located higher and not engage the pressure sensor. Thus, the hand the user is using (e.g., the right hand or the left hand) may be determined based upon which side has the pressure sensor engaged. For example, if the pressure sensor is engaged on the left side, the user is using his or her left hand and if the pressure sensor is engaged on the right side, the user is using his or her right hand.

In one embodiment, if the one or more sensors do not detect one of the conditions described above, the endpoint device 100 may assume that the user is not using a single hand. As a result, the endpoint device 100 may keep the original size of the user interfaces to fill the touch screen display 108.

In one embodiment, the endpoint device 100 may include one or more user interfaces displayed on the touch screen display 108. The user interface may include an application 110 (e.g., a program, a web browser, an email client, calendar application, and the like) or a keyboard 112. The application 110 and the keyboard 112 may be also interchangeably referred to as the user interface 110 and 112. The user interface may include one or more objects $114_1$-$114_n$ (herein also referred to collectively as an object or objects 114). The objects 114 may be graphical buttons on the touch screen display 108 that elicit a response or action by the endpoint device 100 (e.g., a keyboard button to type a letter, number or symbol, a confirmation button on an application, a hyperlink on a web browser, and the like).

In one embodiment, the endpoint device 100 may also include a button 106 to engage a single hand operation mode. In one embodiment, the button 106 may be a physical button located externally, as illustrated in FIG. 1, or a soft button as an object 114 on the touch screen display 108.

In one embodiment, the button 106 may allow a user to selectively enter and exit the single hand operation mode so that the endpoint device 100 does not continuously adjust and move the user interface on the touch screen display 108.

Alternatively, the user may temporarily want the user interface displayed on a full screen even when using the endpoint device 100 with a single hand.

Figure 2:
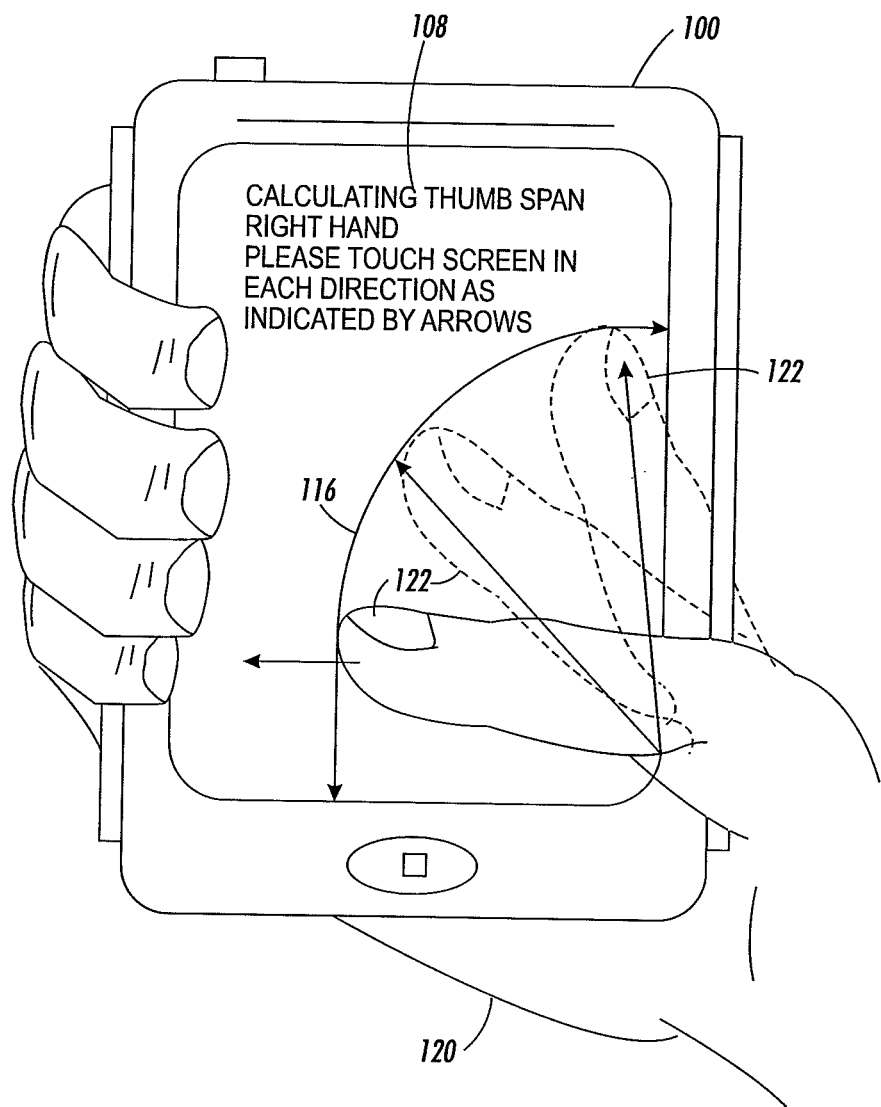
FIG. 2 illustrates an example block diagram of calculating a thumb span of a user on the endpoint device.

FIG. 2 illustrates one embodiment of the endpoint device 100 calculating the thumb span 116 of a user. In one embodiment, the endpoint device 100 may calculate the thumb span 116 as part of an initialization sequence when the user first purchases the endpoint device 100. In another embodiment, the endpoint device 100 may allow multiple users to create different user accounts. The endpoint device 100 may calculate the thumb span 116 whenever a new user account is created.

In another embodiment, the endpoint device 100 may have a menu option to allow the user to manually initiate the calculation of the thumb span 116. For example, the thumb span 116 may need to be periodically recalibrated.

In one embodiment, the endpoint device 100 may calculate the thumb span 116 for the user's right hand and the user's left hand. For example, the thumb span 116 of each user's hand may be different due to slightly different sized thumbs on each hand, unequal flexibility and/or mobility of the thumb on each hand, and the like.

In addition, the thumb span 116 may be calculated for each one of a plurality of different users. For example, everyone has a different sized thumb and different mobility in his or her thumb. As a result, each user may have a unique thumb span 116. By calculating the thumb span 116 for each hand of the user and for different users, the endpoint device 100 will know precisely how much the user interface needs to be resized and moved to provide a comfortable single handed operation user experience for the user. For example, the thumb span 116 may include a height and a width for the dimensions of the thumb span 116.

In one embodiment, the endpoint device 100 may ask the user to touch various areas of the touch screen display 108. In one embodiment, the different areas may include a bottom most left or right corner, a 45 degree left or right corner and an upper most left or right corner. For example, in FIG. 2, the user is using his right hand and the user's right thumb 122 is illustrated as touching the bottom most left corner, a 45 degree left corner and an upper most right corner. The endpoint device 100 may receive these inputs and interpolate the area that spans these points touched by the user's thumb 122.

It should be noted that although FIG. 2 illustrates taking three inputs from the thumb 122, that any number of inputs may be taken to calculate the thumb span 116. For example, more inputs may provide more accurate dimensions of the thumb span 116, but take more time from the user. Conversely, fewer inputs may provide less accurate dimensions of the thumb span 116, but require less time from the user.

Figure 3:
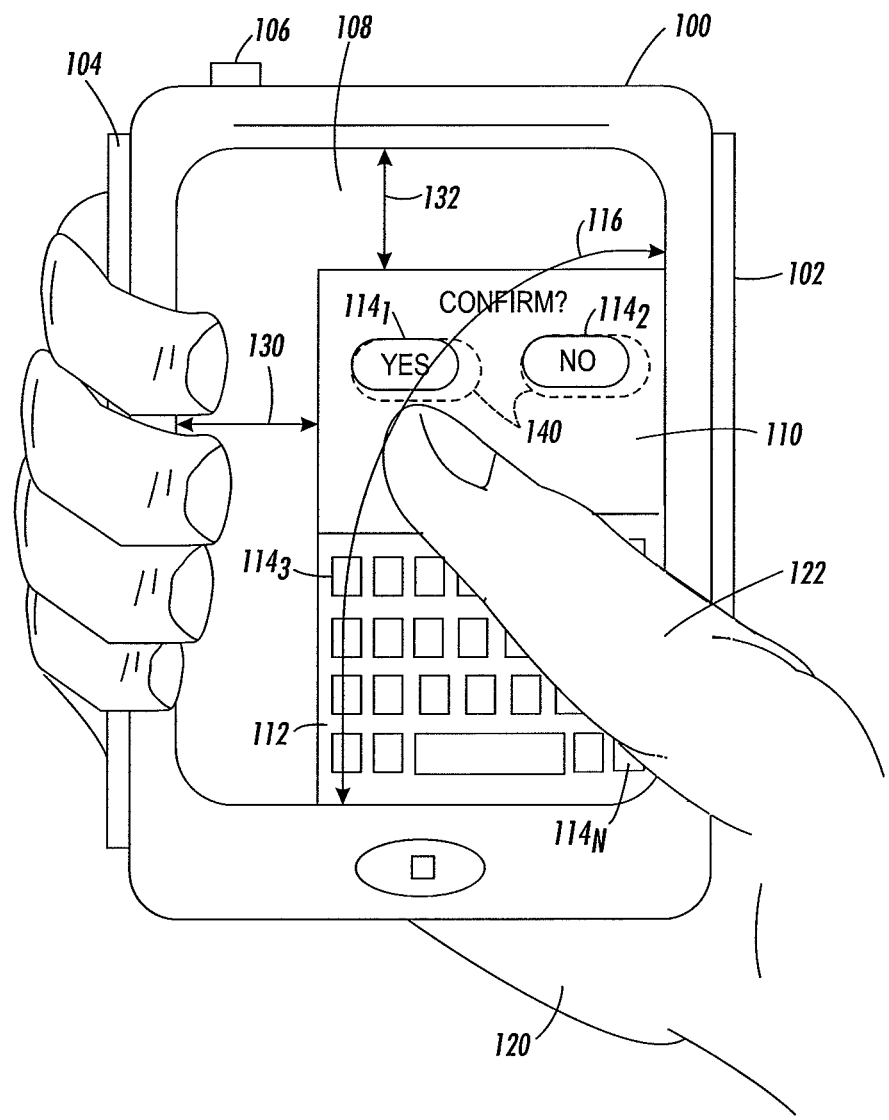
FIG. 3 illustrates an example block diagram of the endpoint device having the user interface adjusted and moved towards a single hand of the user.

FIG. 3 illustrates the endpoint device 100 having a size of the user interface (e.g., the application 110 and the keyboard 112) adjusted and moved to be within the thumb span 116 of the user. For example, based upon the dimensions of the endpoint device 100 and/or the touch screen display 108, the user interfaces may be reduced in size by a width adjustment 130 and a height adjustment 132. The value of the width adjustment 130 and the height adjustment 132 may be calculated by a difference in the dimensions of the touch screen display 108 and the thumb span 116. The width adjustment 130 and the height adjustment 132 may be customized for each different user based upon his or her thumb span 116.

As a result, when the one or more sensors 102 and 104 detect that the user is operating the endpoint device 100 with a single hand, the endpoint device 100 may automatically adjust a size of the user interfaces 110 and 112 to be reduced within the thumb span 116. The endpoint device 100 may also automatically move the user interfaces 110 and 112 in a direction towards a hand that the use is using (e.g., towards a right thumb if the user is using his or her right hand or towards a left thumb if the user is using his or her left hand).

Notably, FIG. 3 illustrates how the user interfaces 110 and 112 are reduced in size to be smaller than the original size of the user interfaces 110 and 112 illustrated in FIG. 1. In addition, FIG. 3 illustrates the user using his or her right hand 120 to operate the endpoint device 100. As a result, the user interfaces 110 and 112 are moved toward the right thumb 122. Thus, FIG. 3 illustrates how the user interfaces 110 and 112 are within the thumb span 116 of the user such that the user can reach all of the objects 114 within the user interfaces 110 and 112 using a single hand.

In one embodiment, the endpoint device 100 may continuously monitor, via the one or more sensors 102 and 104, which hand is being used. As a result, if the user switches from using his or her right hand to using his or her left hand, the endpoint device 100 may automatically reduce the user interfaces 110 and 112 to be within the thumb span 116 of the left hand and move the user interfaces 110 and 112 in a direction towards the left thumb. As noted above, the optional button 106 may be used to enable or disable a single handed operation mode such that the endpoint device 100 maintains a full screen on the touch screen display 108 and/or disable the sensors 102 and 104.

In one embodiment, the reduced size of the user interfaces 110 and 112 illustrated in FIG. 3 may display all of the objects that were displayed in the originally sized user interfaces 110 and 112 illustrated in FIG. 1. For example, each one of the objects 114 may also be reduced in size to accommodate the smaller size of the user interfaces 110 and 112.

In one embodiment, a touch area 140 of one or more of the objects 114 may be maintained (e.g., kept the same size as in the originally sized user interface and not reduced in proportion to the reduced size of the objects 114) or be larger than the respective object 114. The touch area 140 may be an area that is associated with the object 114. The enlarged touch area 140 may allow the user to select the corresponding object 114 without having to precisely touch the object 114. This may be beneficial when the user interfaces 110 and 112 and the corresponding objects 114 are reduced in size and make it difficult for the user to precisely touch a smaller object 114.

In another embodiment, the touch area 140 may be resized proportionally with the objects 114. In other words, the touch are 140 may also be reduced and/or moved by a same amount each corresponding object 114 is resized and moved. In another embodiment, only the touch area 140 may be resized and moved to be within the thumb span 116 of the user, while the objects 114 are kept the same size.

In another embodiment, the objects 114 may be kept a same size. A vertical scroll bar and a horizontal scroll bar may be added to the user interfaces 110 and 112 to allow a user to scroll up and down and/or left and right to view the various objects 114, while maintaining the originally sized objects 114 in the reduced size of the user interfaces 110 and 112.

As a result, the present disclosure provides an endpoint device 100 that is larger than a user's hand that can still provide a satisfactory user experience when the user decides to operate the endpoint device 100 with a single hand. The endpoint device 100 can automatically detect single handed operation and identify which hand the user is using. In response, the endpoint device 100 can adjust the size of the user interfaces and move the user interfaces 110 and 112 towards a thumb 122 of the hand 120 the user is using such that all of the objects 114 within the user interfaces are within the thumb span 116 of the user.

Figure 4:
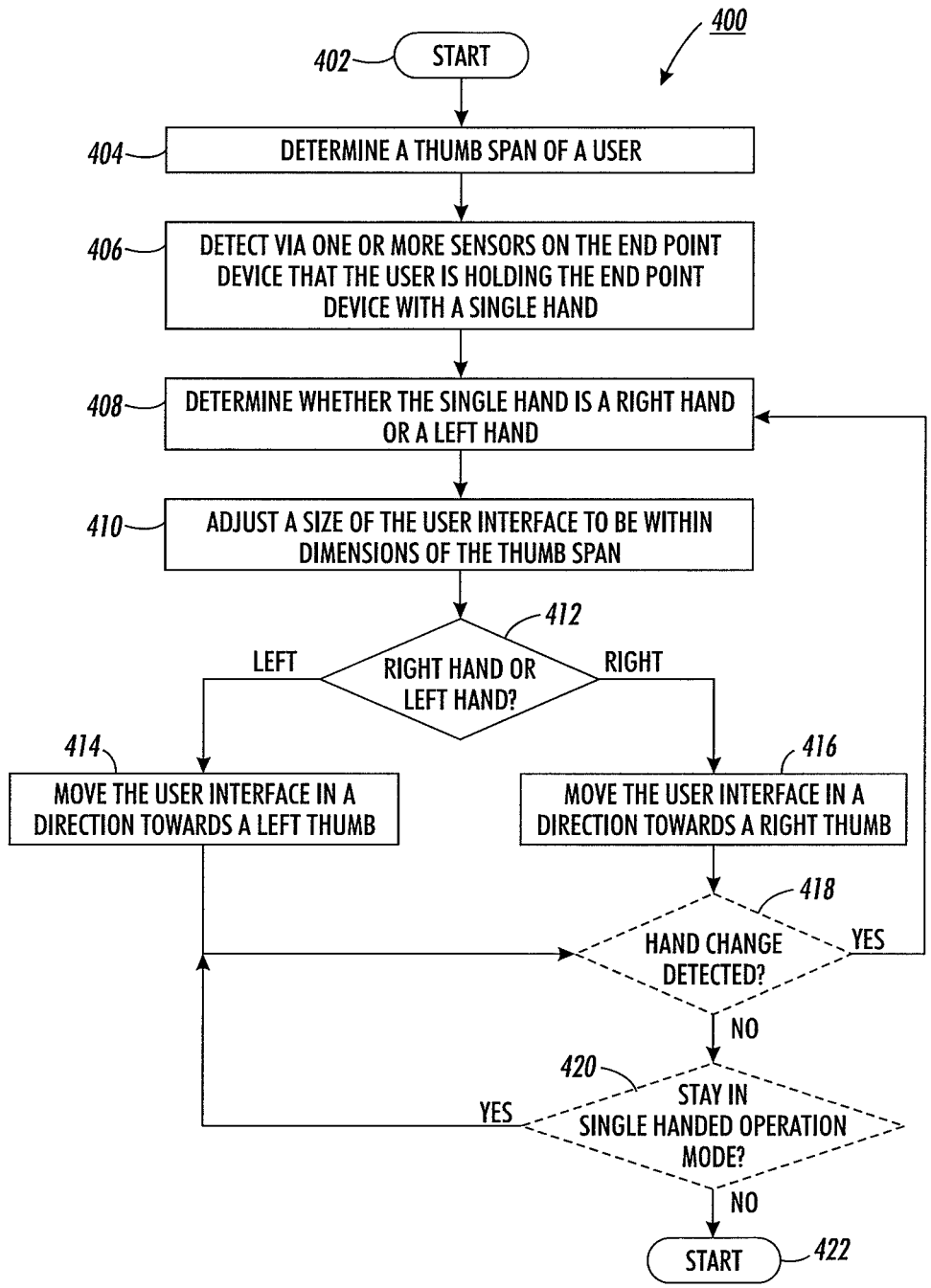
FIG. 4 illustrates an example flowchart of one embodiment of a method for adjusting and moving a user interface for single handed use on an endpoint device.
Figure 5:
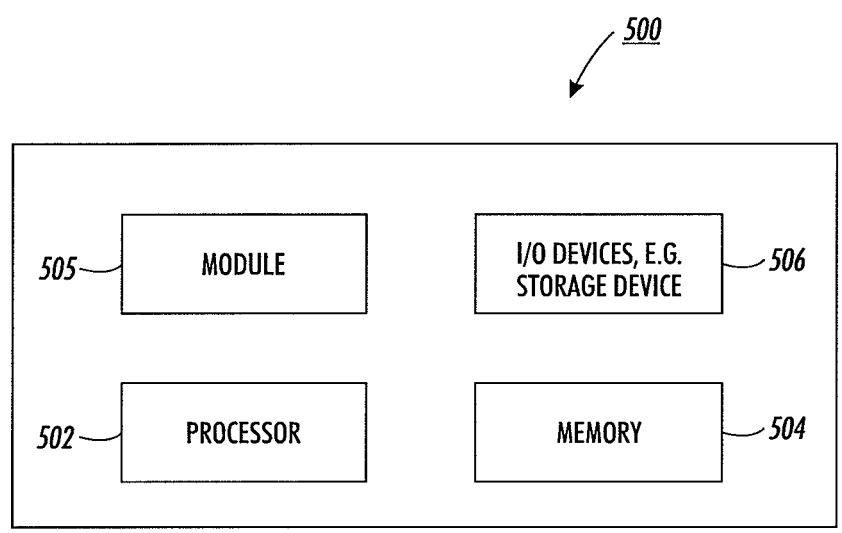
FIG. 5 illustrates a high-level block diagram of a general-purpose computer suitable for use in performing the functions described herein.

FIG. 4 illustrates a flowchart of a method 400 for adjusting and moving a user interface for single handed use on an endpoint device. In one embodiment, one or more steps or operations of the method 400 may be performed by the endpoint device 100 having an LED printhead or a general-purpose computer as illustrated in FIG. 5 and discussed below.

At step 402 the method 400 begins. At step 404, the method 400 determines a thumb span of a user. In one embodiment, the endpoint device may receive multiple inputs of a user's thumb at various different areas of a touch screen display, as described above with reference to FIG. 2. The endpoint device may then calculate dimensions (e.g., a width and/or a height) of the user's thumb span. Based on the dimensions of the touch screen display of the endpoint device and the user's thumb span, the endpoint device may calculate the required width adjustment and/or the height adjustment to reduce the size of a user interface to be within the user's thumb span.

In one embodiment, a thumb span may be determined for both the user's left hand and right hand. In one embodiment, a thumb span may be calculated for each user profile if different users are capable of logging into the endpoint device.

At step 406, the method 400 detects via one or more sensors on the endpoint device that the user is holding the endpoint device with a single hand. In one embodiment, the one or more sensors may be on continuously and continuously monitor for detecting single handed operation of the endpoint device. In another embodiment, a button (e.g., an external physical button or a software button on the touch screen display) may be used to allow the user to selectively engage or disengage a single handed operation mode. Alternatively, the button may be used to turn the one or more sensors on and off.

In one embodiment, the endpoint device may have sensors on each side of the endpoint device. The one or more sensors may comprise capacitive sensor array, a temperature sensor, an optical sensor or a pressure sensor. How each one of the various types of sensors are used is discussed above.

At step 408, the method 400 determines whether the single hand is a right hand or a left hand. As discussed above, the various types of sensors may detect whether the user is using his or her left hand or right hand, as discussed above. For example, the hand of the user may be determined based upon whether two or more consecutive sensors in the capacitive sensor array are contacted, based on a difference in temperature between the sides of the endpoint device, based upon whether the optical sensor is blocked or not blocked or based on whether a pressure sensor is engaged or not engaged. The determination of the whether the user is using his or her left hand or right hand may be used later in the method 400 to determine which direction to move the user interface on the touch screen display.

At step 410, the method 400 adjusts a size of the user interface to be within dimensions of the thumb span. As discussed above, the endpoint device may calculate the width adjustment and/or height adjustment required to reduce the size of the user interface to fit within the user's thumb span. The adjustment may be customized for each user. In other words, different users may have different dimensions for his or her thumb span and the amount of the width adjustment and/or the height adjustment may be based on the respective thumb spans.

In one embodiment, the reduced size of the user interface may display all of the objects that were displayed in the originally sized user interface. For example, each one of the objects may also be reduced in size to accommodate the smaller size of the user interface.

In one embodiment, a touch area of one or more of the objects may be maintained (e.g., kept the same size as in the originally sized user interface and not reduced in proportion to the reduced size of the objects) or be larger than the respective object. The touch area may be an area that is associated with the object. The enlarged touch area may allow the user to select the corresponding object without having to precisely touch the object. This may be beneficial when the user interface and the corresponding objects are reduced in size and make it difficult for the user to precisely touch a smaller object.

In another embodiment, the objects may be kept a same size. A vertical scroll bar and a horizontal scroll bar may be added to the user interface to allow a user to scroll up and down and/or left and right to view the various objects, while maintaining the originally sized objects in the reduced size of the user interface.

At step 412, the method 400 identifies whether the user is using the right hand or the left hand based upon the step 408. If the user is using his or her left hand, the method 400 proceeds to step 414.

At step 414, the method 400 moves the user interface in a direction towards a left thumb of the user's left hand. The method 400 may then proceed to optional step 418.

Referring back to step 412, if the user is using his or her right hand, the method 400 may proceed to step 416. At step 416, the method 400 moves the user interface in a direction towards a right thumb of the user's right hand. The method 400 may then proceed to optional step 418.

At optional step 418, the method 400 may determine if a hand change is detected. For example, the user may change holding his or her endpoint device in his or her right hand to his or her left hand. Thus, the user interface may need to be readjusted and moved towards the thumb of the appropriate hand. In one embodiment, the method 400 may continuously detect, adjust and move the user interface in response to user changing the hand (e.g., right hand or left hand) that is holding the endpoint device.

If the hand change is detected at the optional step 418, the method 400 may return to step 408. If no hand change is detected at the optional step 418, the method 400 may proceed to optional step 420.

At optional step 420, the method 400 may determine if it should stay in the single handed operation mode. For example, as long as the endpoint device is in the single handed operation mode, the endpoint device may continually adjust and move the user interface in response to the detection of changing hands. If the method 400 is to stay in the single handed operation mode, the method 400 may loop back to the optional step 418 to monitor whether a hand change is detected.

If the user decides to exit the single handed operation mode (e.g., to return to using two hands, prevent resizing of the user interface, and the like), the method 400 may proceed to step 422. At step 422, the method 400 ends.

It should be noted that although not explicitly specified, one or more steps, functions, or operations of the method 400 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 4 that recite a determining operation, or involve a decision, do not necessarily require that both branches of the determining operation be practiced. In other words, one of the branches of the determining operation can be deemed as an optional step.

FIG. 5 depicts a high-level block diagram of a general-purpose computer suitable for use in performing the functions described herein. As depicted in FIG. 5, the system 500 comprises one or more hardware processor elements 502 (e.g., a central processing unit (CPU), a microprocessor, or a multi-core processor), a memory 504, e.g., random access memory (RAM) and/or read only memory (ROM), a module 505 for adjusting and moving a user interface for single handed use on an endpoint device, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 505 for adjusting and moving a user interface for single handed use on an endpoint device (e.g., a software program comprising computer-executable instructions) can be loaded into memory 504 and executed by hardware processor element 502 to implement the steps, functions or operations as discussed above in connection with the exemplary method 400. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for adjusting and moving a user interface for single handed use on an endpoint device (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for adjusting and moving a reduced size user interface for single handed use on an endpoint device, comprising:

determining, by a processor, a thumb span of a hand of a user on a touch screen display of the endpoint device;

detecting, by the processor, that a button has been engaged to enable a single hand operation mode;

detecting, by the processor, via one or more sensors on the endpoint device that the user is holding the endpoint device with a single hand, wherein the detecting the user is holding the endpoint device with the single hand further comprises detecting whether the user is holding the endpoint device with a left hand of the user or a right hand of the user, wherein the one or more sensors comprise a first temperature sensor on a left side of the endpoint device and a second temperature sensor on a right side of the endpoint device to determine the user is holding the endpoint device with the left hand when a first temperature measurement of the first temperature sensor is greater than and a second temperature measurement of the second temperature sensor, or the user is holding the endpoint device with the right hand when the second temperature measurement of the second temperature sensor is greater than the first temperature measurement of the first temperature sensor;

in response to the detecting, via the one or more sensors on the endpoint device that the user is holding the endpoint device with the single hand, reducing, by the processor, a size of an originally sized user interface to produce the reduced size user interface that is within dimensions of the thumb span of the determined single hand; and in response to the producing the reduced size user interface, moving, by the processor, the reduced size user interface in a direction towards the determined single hand that the user is holding the endpoint device with the single hand; and in response to the moving the reduced size user interface in the direction towards the determined single hand, adding a vertical scroll bar and a horizontal scroll bar in the reduced size user interface while each one of the plurality of objects displayed on the reduced size user interface that maintains the same size as in the originally sized user interface and not reduced in proportion to the reduced size of the plurality of objects.

2. The method of claim 1, wherein the determining the thumb span comprises:

receiving, by the processor, an input by the thumb of the hand of the user on a plurality of different points on the touch screen display of the endpoint device.

3. The method of claim 1, wherein the reducing the size of the originally sized user interface comprises reducing a width of the originally sized user interface to be within the dimensions of the thumb span.

4. The method of claim 1, wherein the reducing the size of the originally sized user interface comprises reducing a height of the originally sized user interface to be within the dimensions of the thumb span.

5. The method of claim 1, wherein the moving the reduced size user interface comprises moving the reduced size user interface towards a right thumb of the user or a left thumb of the user based on whether the single hand is the right hand or the left hand.

6. A non-transitory computer-readable medium storing a plurality of instructions which, when executed by a processor, cause the processor to perform operations for adjusting and moving a reduced size user interface for single handed use on an endpoint device, the operations comprising:

determining a thumb span of a hand of a user on a touch screen display of the endpoint device;

detecting that a button has been engaged to enable a single hand operation mode;

detecting via one or more sensors on the endpoint device that the user is holding the endpoint device with a single hand wherein the detecting the user is holding the endpoint device with the single hand further comprises detecting whether the user is holding the endpoint device with a left hand of the user or a right hand of the user, wherein the one or more sensors comprise a first temperature sensor on a left side of the endpoint device and a second temperature sensor on a right side of the endpoint device to determine the user is holding the endpoint device with the left hand when a first temperature measurement of the first temperature sensor is greater than and a second temperature measurement of the second temperature sensor, or the user is holding the endpoint device with the right hand when the second temperature measurement of the second temperature sensor is greater than the first temperature measurement of the first temperature sensor;

in response to the detecting, via the one or more sensors on the endpoint device that the user is holding the endpoint device with the single hand, reducing a size of an originally sized user interface to produce the reduced size user interface that is within dimensions of the thumb span of the determined single hand; and in response to the producing the reduced size user interface, moving the reduced size user interface in a direction towards the determined single hand that the user is holding the endpoint device with the single hand; and in response to the moving the reduced size user interface in the direction towards the determined single hand, adding a vertical scroll bar and a horizontal scroll bar in the reduced size user interface while each one of the plurality of objects displayed on the reduced size user interface that maintains the same size as in the originally sized user interface and not reduced in proportion to the reduced size of the plurality of objects.

7. The non-transitory computer-readable medium of claim 6, wherein the determining the thumb span comprises:

receiving an input by the thumb of the hand of the user on a plurality of different points on the touch screen display of the endpoint device.

* * * * *